J. REESE.
Machine for Cutting off Bars, Tubes, Cylinders, &c.

No. 159,448

Patented Feb. 2, 1875.

Witnesses
James D. Kay
Frederick Standish

Inventor
Jacob Reese
by Bakewell & Kerr
Attys.

UNITED STATES PATENT OFFICE.

JACOB REESE, OF PITTSBURG, PENNSYLVANIA.

IMPROVEMENT IN MACHINES FOR CUTTING OFF BARS, TUBES, CYLINDERS, &c.

Specification forming part of Letters Patent No. 159,448, dated February 2, 1875; application filed August 7, 1874.

*To all whom it may concern:*

Be it known that I, JACOB REESE, of Pittsburg, in the county of Allegheny and State of Pennsylvania, have invented a new and useful Improvement in Machine for Sawing Metal; and I do hereby declare the following to be a full, clear, and exact description thereof, reference being had to the accompanying drawing, forming part of this specification, in which—

Figure 1:
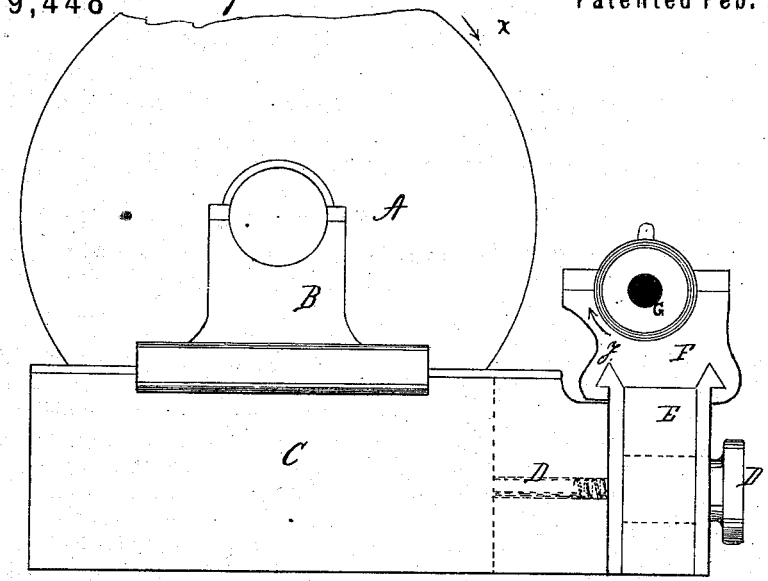
Figure 2:
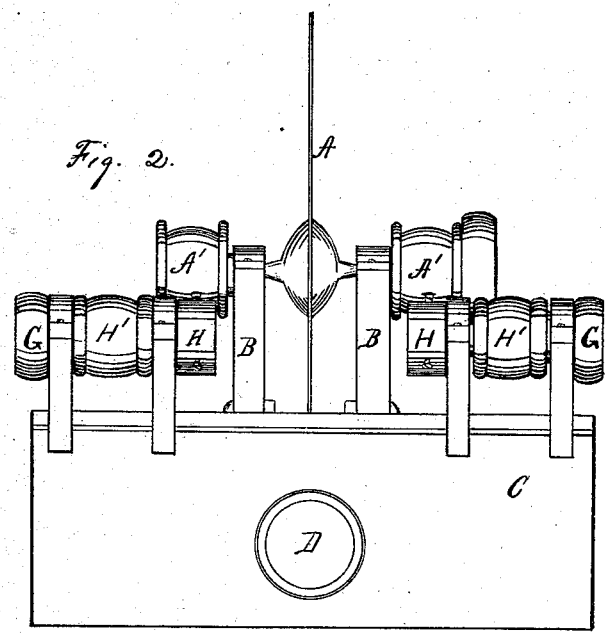

Figure 1 is a side view of my improved apparatus, and Fig. 2 is a front view of the same.

Like letters of reference indicate like parts in each.

My invention relates to methods and apparatus for cutting metals, such as cast-steel shafting, tubing, &c.; and consists, first, of a rotating cutting-disk of mild steel or iron, having a smooth periphery and mounted in suitable journals, combined with hollow mandrels provided with chucks, and mounted in suitable guides, whereby the article to be cut is caused to revolve at a lower rate of speed than the cutting-disk; and, secondly, in subjecting the article to be cut to the action of a rotating disk of mild steel or iron, having a smooth periphery, the metal to be cut being caused to revolve at a lower rate of speed than the cutting-disk, whereby a frictional and even cut is obtained.

In the drawings referred to, A represents the cutting-disk or saw, mounted in the bearings B, movable in guides on the frame C. The cutting-disk A is of mild steel or iron, and is some forty-six inches in diameter and three-sixteenths of an inch thick, more or less, having a smooth periphery devoid of teeth. Its shaft is provided with the pulleys A' A', by which it is rotated. The sliding bearings of the cutting-disk are controlled by means of the screw D or other suitable device for causing the disk to approach or recede from the mandrel containing the tubing or rod to be cut. On one end of the main frame C is the track E, on which, in suitable sliding bearings F, the hollow mandrels are placed, said track being at right angles to the travel of the sliding bearings of the cutting-disk. F F are sliding bearings moving upon the track E, in which are journaled the hollow mandrels G. Each of the hollow mandrels G is provided with the chuck H for securing the rod or tubing placed within the same; and it is also provided with the pulley H' for imparting motion thereto. These comprise the several elements entering into my apparatus, and their operation is as follows:

The steel tube or shaft to be cut is placed in the hollow mandrel G, and screwed up in the chucks. Motion is then imparted to the disk or saw A, through the medium of the pulleys A', until a speed of about two thousand revolutions per minute is attained. The screw D is then operated to bring the saw into contact with the article to be cut held within the hollow mandrels, the hollow mandrel, through the medium of suitable belts and pulleys H', being revolved at a speed of about two hundred revolutions per minute. The cutting-disk A, moving in the direction shown by the arrow $x$, while the mandrels are preferably caused to move in the direction shown by the arrow $y$. The saw, traveling at a greater speed than the article contained within the mandrel, will have a rubbing or frictional motion on the article; and, as the article itself is revolved during the cutting, as the cutting proceeds the shaft or tube will have a uniform slot cut entirely around it, said slot being deepened as the saw is brought closer, until the metal is cut through. By these devices a two-inch gas-pipe may be cut through in about fifteen seconds, while a cast-steel shaft of one and a half inch in diameter can be cut in about one minute, which is much quicker than has heretofore been accomplished.

I am aware that it is not new to cut or saw iron, but the main points involved in this invention are the sawing of steel or iron rods or tubing into lengths when cold, and causing the article to be cut to revolve while the cutting is going on. Heretofore, in cutting iron or steel, the article has been heated and remained stationary while the saw traveled, the result of which was that the slot formed by the saw had a tendency to bend on the side first entered, so that a square cut could not be made; and, furthermore, when the saw passed through the metal, a fin was formed upon the opposite side, which required turning off; and, should the saw wabble, as is usual, in entering, the slot upon the entering side would generally be wider. All these difficulties are avoided in my machine by the simple rotation of the metal to be cut, which gives great advantage in the cutting of tubing, shafting, and similar articles; for if, in tubing, there was more fin upon one side of the tube than the other, then the thread, when cut, would be cut deeper on that side; and, in cutting shafting, accurate lengths could not be obtained, and the ends must necessarily be dressed by a blacksmith before they could be centered for the lathe, while in the present invention accurate lengths may be cut, and the shaft is at once ready to center.

Having thus described my invention, what I claim, and desire to secure by Letters Patent, is—

1. The rotating cutting-disk A of mild steel or iron, having a smooth periphery and mounted in bearings B, moving in guides, in combination with the hollow mandrels H, provided with chucks, and mounted in bearings F, moving in guides at right angles to the guides of the cutting-disk, substantially as and for the purpose specified.

2. As an improvement in the art of cutting off metallic bars, tubes, cylinders, &c., that are herein described, namely, subjecting the metal to be cut to the action of a rotating disk of mild steel or iron, said disk having a smooth periphery, the metal to be cut being caused, by suitable mechanism, to revolve at a lower rate of speed than the cutting-disk, substantially as specified.

In testimony whereof I, the said JACOB REESE, have hereunto set my hand.

JACOB REESE.

Witnesses:
F. W. RITTER, Jr.,
T. B. KERR.